United States Patent
Kamphues

[11] 3,893,574
[45] July 8, 1975

[54] GRIPPER DEVICES FOR LAYERS OF BRICK MOULDINGS

[76] Inventor: Hermann Kamphues, Prinzhugel 19b, 5433 Laggenbeck, Germany

[22] Filed: Nov. 6, 1973

[21] Appl. No.: 413,376

[30] Foreign Application Priority Data
Nov. 7, 1972 Germany............ 2254432

[52] U.S. Cl............ 214/6 A; 214/8.5 C; 294/63 R; 294/67 BB
[51] Int. Cl............................................ B66c 1/32
[58] Field of Search............ 294/62, 63 R, 64 R, 65, 294/67 R, 67 B, 67 BB, 81 R, 87 R, 87.26; 214/6 R, 6 A, 6 N, 8.5 B, 8.5 C

[56] References Cited
UNITED STATES PATENTS

| 2,903,290 | 9/1959 | Morris et al. | 294/65 |
| 3,179,460 | 4/1965 | Gunzelmann | 294/63 R |
| 3,230,001 | 1/1966 | Hirt | 294/64 R |
| 3,270,897 | 9/1966 | Lingl | 294/63 R X |
| 3,392,851 | 7/1968 | Pearne et al. | 294/63 R X |
| 3,700,274 | 10/1972 | Paschal | 294/63 R |

*Primary Examiner*—Evon C. Blunk
*Assistant Examiner*—Johnny D. Cherry

[57] ABSTRACT

A gripper device for a layer of brick mouldings arranged in rows comprises outer jaws arranged to grip opposite sides of the layer, the outer jaws being fixed against displacement longitudinally of the rows. A first, fixed, intermediate jaw is arranged between two pairs of rows, and second intermediate jaws are arranged between the individual rows of the two pairs of rows. The second jaws are displaceable longitudinally of the rows whereby to orientate the rows of mouldings into herringbone configuration.

4 Claims, 4 Drawing Figures

3,893,574

GRIPPER DEVICES FOR LAYERS OF BRICK MOULDINGS

BACKGROUND OF THE INVENTION

1. Field of the Invention

The present invention relates to a gripper device for displacing and lifting rows of brick mouldings.

2. Description of the Prior Art

Austrian Patent Specification No. 164083 relates to apparatus for bringing together rows of brick mouldings and thereafter pivoting the mouldings.

In this previously proposed apparatus, such movement of the mouldings is effected by means of a "lazy-tongs" device carrying pairs of pivotal clamping jaws. The clamping jaws are connected by means of crank arms and connecting rods such that movement of the lazy-tongs causes uniform pivoting of the jaws and thus of the mouldings clamped between the jaws.

Because of the numerous levers and pivot points this previously proposed apparatus is expensive and is also liable to malfunction. Moreover, the pivot points are subjected to heavy wear, which impairs the economic efficiency of the apparatus. Furthermore, with this previously proposed apparatus only mouldings having one and the same shape can be handled.

German Patent Specification No. 1,163,226 relates to a gripper device having intermediate tongues which act as intermediate jaws and which are so arranged that they are not displaceable in their longitudinal direction.

SUMMARY OF THE INVENTION

According to the present invention, there is provided in a gripper device for locating layers of brick mouldings arranged in an even number of rows in stacks in inclined cross combination, outer jaws arranged to grip the rows, said outer jaws being fixed against longitudinal displacement, and first and second intermediate jaw means located between the outer jaws and arranged to engage between the rows, the first intermediate jaw means being located between pairs of rows and being fixed against longitudinal displacement, and the second intermediate jaw means being displaceable longitudinally.

Further according to the present invention, there is provided in a gripper device for a layer of brick mouldings composed of a plurality of rows of mouldings, outer jaws displaceable transversely of the rows to grip opposite sides of the layer, the outer jaws being fixed against lontigudinal displacement relative to the rows, at least one first intermediate jaw arranged between the outer jaws, and at one pair of second intermediate jaws arranged between the outer jaws, the intermediate jaws being located between respective rows, the first intermediate jaw being located between the pair of second intermediate jaws and being fixed against longitudinal displacement relative to the rows, and the second intermediate jaws being mounted for longitudinal displacement relative to the rows whereby the rows of mouldings are displaced into a herringbone configuration upon longitudinal displacement of the second intermediate jaws.

BRIEF DESCRIPTION OF THE DRAWINGS

An embodiment of the invention will now be described, by way of example only, with reference to the accompanying diagrammatic drawings, in which.

DESCRIPTION OF THE PREFERRED EMBODIMENT

Figure 1:
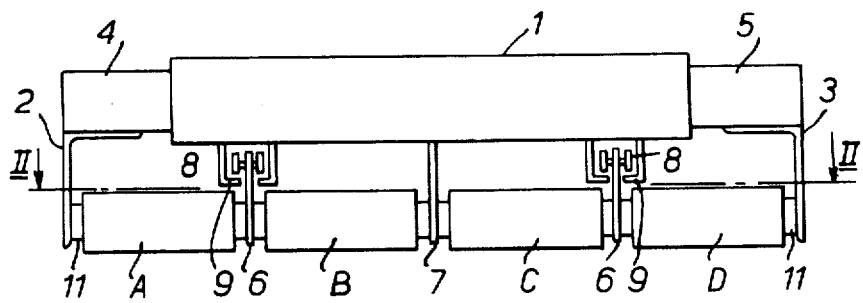
FIG. 1 is an elevation of a gripper device in accordance with the invention.

As shown in FIG. 1, the gripper device comprises a frame 1 and two outer jaws 2 and 3 which are movable transversely relative to rows of brick mouldings A to D but not longitudinally of the rows. The jaws 2 and 3 are mounted on piston rods 4 and 5 of a cylinder which is supplied with a pressurized fluid. By this means the two outer jaws 2 and 3 can be moved closer together or further away from one another.

Two intermediate jaws 6 and a single intermediate jaw 7 are mounted between the two outer jaws 2 and 3 and arranged to engage between the rows of mouldings A to D. In this arrangement the jaw 7 is located between the center layer rows of mouldings B and C and is not displaceable in the longitudinal direction, whereas the intermediate jaws 6 are displaceable in the longitudinal direction.

The displaceability of the intermediate jaws 6 in the longitudinal direction can be produced in many different ways. In the embodiment illustrated, pairs of rollers 8 connected to the intermediate jaws 6 are movable along rails 9 which are connected to the frame 1 of the gripper device.

The intermediate jaws 6 and 7 are provided with a resilient layer 10 on both sides, whereas a resilient layer 11 is provded only on the inner side of the outer jaws 2 and 3.

Figure 2:
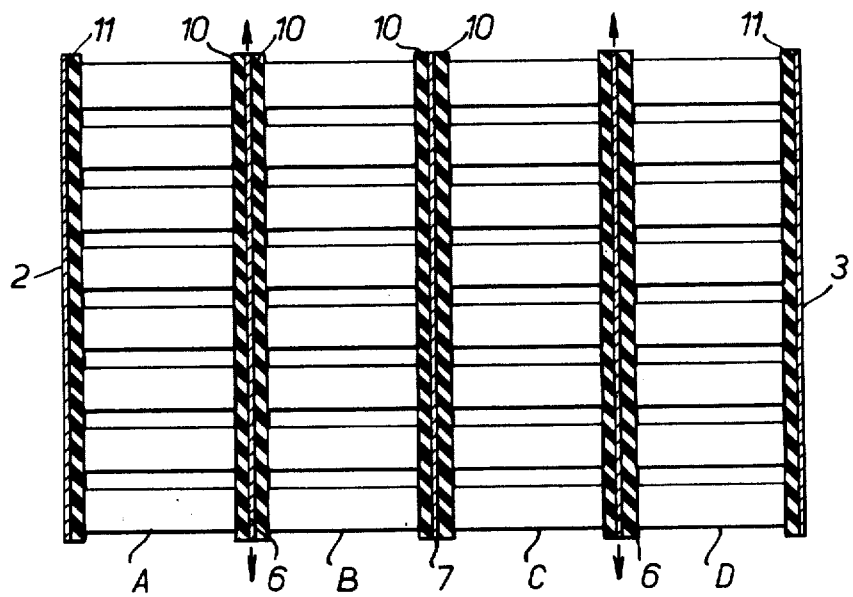
FIG. 2 is a section taken on line II—II in FIG. 1.
Figure 3:
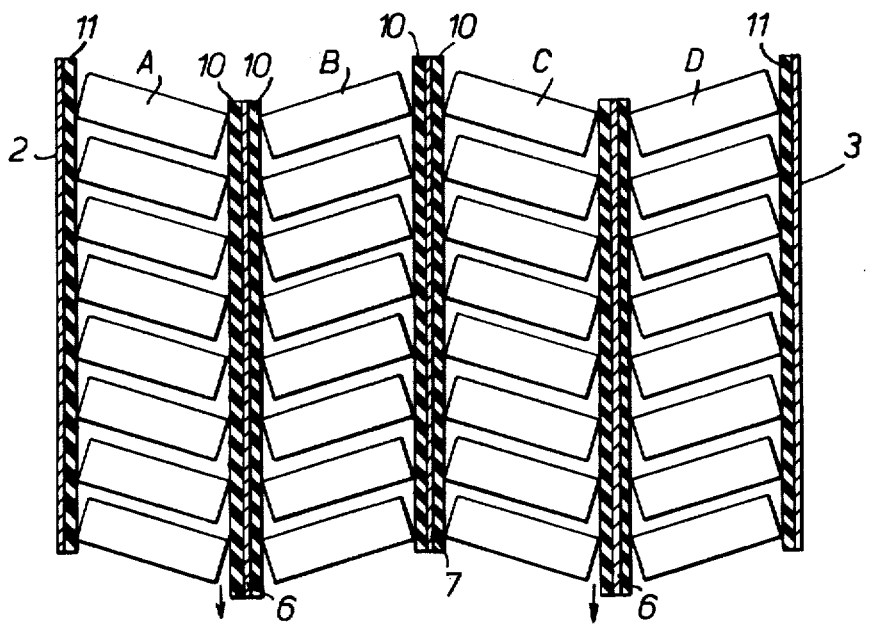
FIGS. 3 and 4 are sections similar to FIG. 2, and illustrating operation of the device.
Figure 4:
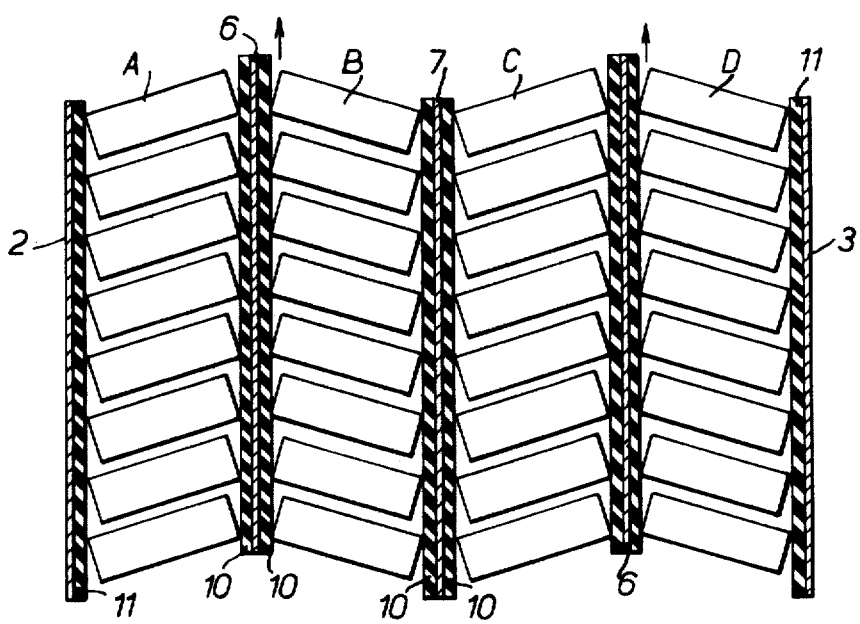

In the initial position shown in FIG. 2, the jaws 2, 3, 6 and 7 are aligned transversely. In order to displace the mouldings into the herringbone configuration shown in FIG. 3, the intermediate jaws 6 are moved in the direction of the arrows shown in FIG. 3; in order to displace the mouldings into the configuration shown in FIG. 4, the intermediate jaws 6 are moved in the opposite direction.

The gripper device described can also be used for displaying layers of bricks composed of more than two pairs of rows.

The layers of mouldings orientated in this manner are than stacked on a kiln truck or the like by the gripper device so that an inclined cross combination is thereby produced.

Thus, in the gripper device particularly described, the mouldings are moved into herringbone cconfiguration by the movement of individual intermediate jaws. The device is simple, reliable in operation, and easy to manipulate. The device can handle mouldings of different shapes. Accordingly there is no need to reconstruct the device when the shape of the mouldings is changed. Further, the gripper device can readily be installed in existing installations.

What is claimed is:

1. In a gripper device for locating layers of brick mouldings in stacks in inclined cross combination, each said layer consisting of an even number of parallel rows of bricks, outer jaws arranged to grip the outer longitudinal edges of the layers and, said outer jaws extending longitudinally of the rows and being fixed against longitudinal displacement relative to the rows, and first and second intermediate jaw means located between the outer jaws and arranged to engage between the longitudinal edges of the rows, said first and second intermediate jaw means extending longitudinally of the rows, the first intermediate jaw means being located between pairs of rows and being fixed against longitudinal displacement relative to the rows, and the second intermediate jaw means being displaceable longitudinally relative to the rows in a substantially rectilinear direction.

2. In a gripper device for locating layers of brick mouldings arranged in an even number of rows in stacks in inclined cross combination, outer jaws arranged to grip the rows, said outer jaws being fixed against displacement longitudinally relative to the rows, first and second intermediate jaw means located between the outer jaws and arranged to engage between the rows, the first intermediate jaw means being located between pairs of rows and being fixed against displacement longitudinally relative to the rows, and the second intermediate row means being displaceable longitudinally relative to the rows a frame, rail means connected to the frame, said rail means extending longitudinally of the rows, and roller means movable along the rail means, said roller means carrying the second intermediate jaw means.

3. A gripper device as claimed in claim 2, further comprising resilient layers provided on opposite sides of the first and second intermediate jaw means.

4. In a gripper device for a layer of brick mouldings composed of a plurality of parallel rows of mouldings arranged side by side, outer jaws displaceable transversely of the rows to grip opposite longitudinal sides of the layer, the outer jaws being fixed against longitudinal displacement relative to the rows, at least one first intermediate jaw arranged between the outer jaws and extending longitudinally of the rows, and at least one pair of second intermediate jaws arranged between the outer jaws, the intermediate jaws being located between respective rows and extending longitudinally of the rows, and at least one pair of second intermediate jaws arranged between the outer jaws, the intermediate jaws being located between respective rows and extending longitudinally of the rows, the first intermediate jaw being located between the pair of second intermediate jaws and being fixed against longitudinal displacement relative to the rows, and the second intermediate jaws being mounted for longitudinal displacement relative to the rows in a direction parallel to the axis of the rows whereby the rows of mouldings are displaced into a herringbone configuration upon such longitudinal displacement of the second intermediate jaws.

* * * * *